United States Patent [19]

Shimizu et al.

[11] Patent Number: 4,727,950
[45] Date of Patent: Mar. 1, 1988

[54] ELECTRIC POWER STEERING SYSTEM FOR VEHICLES

[75] Inventors: Yasuo Shimizu; Toshitake Kawai, both of Tochigi, Japan

[73] Assignee: Honda Giken Koygo Kabushiki Kaisha, Tokyo, Japan

[21] Appl. No.: 77,961

[22] Filed: Jul. 27, 1987

Related U.S. Application Data

[63] Continuation of Ser. No. 827,687, Feb. 10, 1986, abandoned.

[30] Foreign Application Priority Data

Feb. 12, 1985 [JP] Japan .................................. 60-24925

[51] Int. Cl.⁴ ............................................. B62D 5/04
[52] U.S. Cl. ................................................. 180/79.1
[58] Field of Search ...................... 180/79.1, 141, 142; 318/2, 689; 344/424

[56] References Cited

FOREIGN PATENT DOCUMENTS

| | | | |
|---|---|---|---|
| 2056066 | 5/1972 | Fed. Rep. of Germany | 180/141 |
| 7330196 | 3/1975 | France | 180/79.1 |
| 52-71028 | 6/1977 | Japan | 180/141 |
| 58-105876 | 6/1983 | Japan | 180/142 |
| 57-184969 | 4/1984 | Japan | 180/142 |
| 59-70257 | 4/1984 | Japan . | |
| 2145678 | 4/1985 | United Kingdom | 180/79.1 |

Primary Examiner—John J. Love
Assistant Examiner—Charles R. Watts
Attorney, Agent, or Firm—Armstrong, Nikaido, Marmelstein & Kubovcik

[57] ABSTRACT

An electric power steering system (200) for vehicles including a driving control circuit (76, 100, 108) for feeding, in consideration of an output signal ($S_1$, $S_2$) from a steering torque detection mechanism (77) for detecting steering torque (Ts) acting on an input shaft (4), a drive signal (Va) to an electric motor (33) for producing auxiliary torque to be supplied to an output shaft (7). In the steering system, the auxiliary torque to be developed at the electric motor (33) is reduced, under the condition that a steering angle (Th) of the steering wheel has exceeded a predetermined angle ($Th_1$).

7 Claims, 19 Drawing Figures

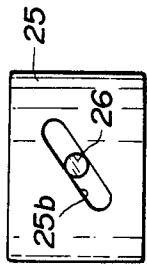
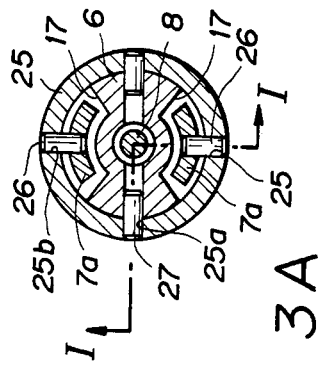
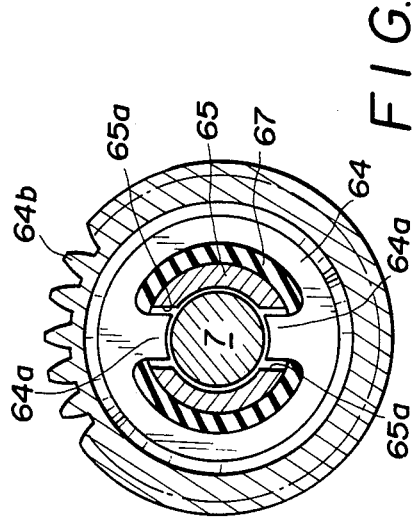
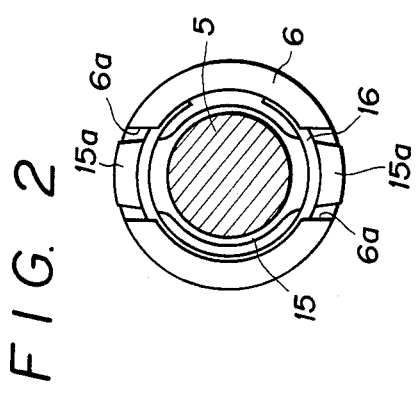
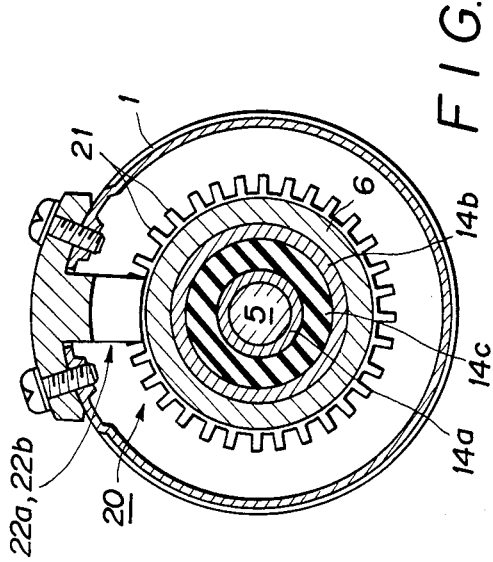

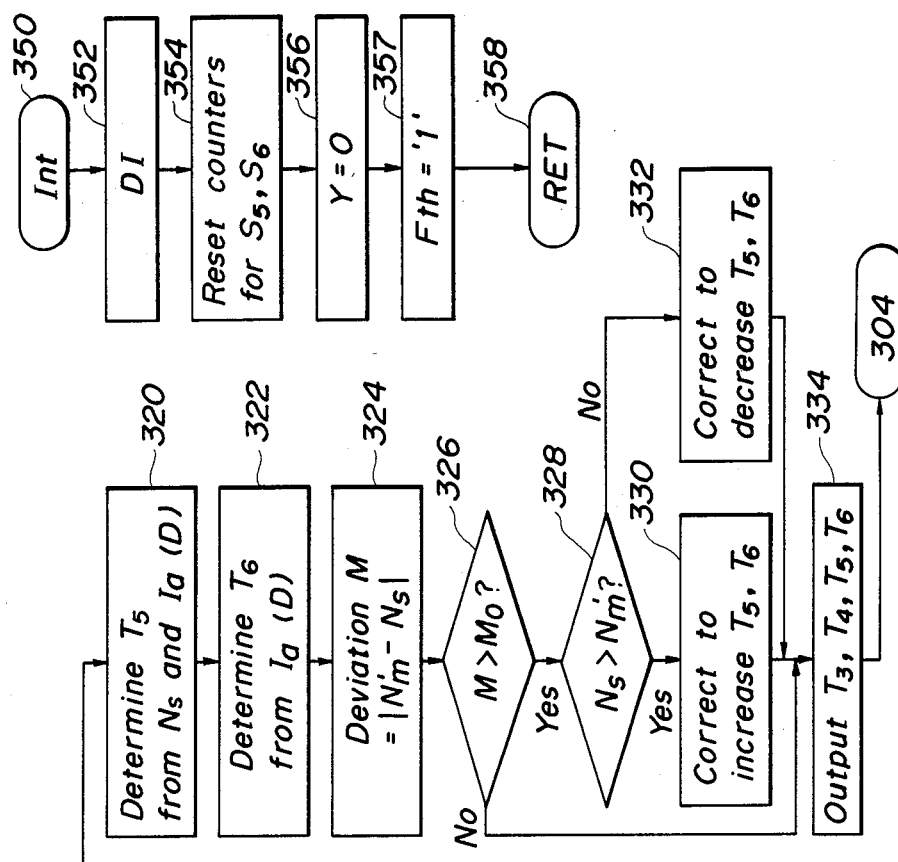
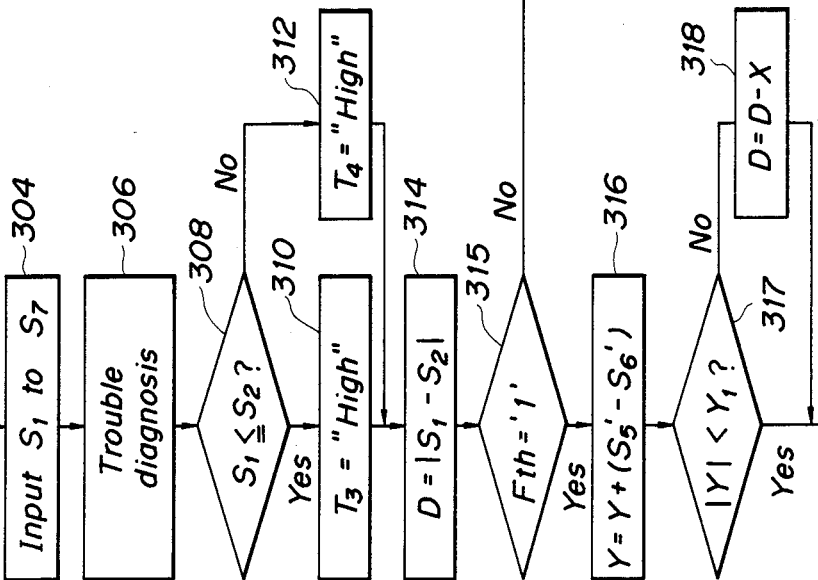
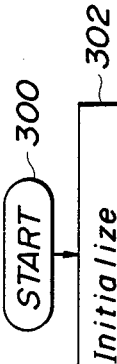

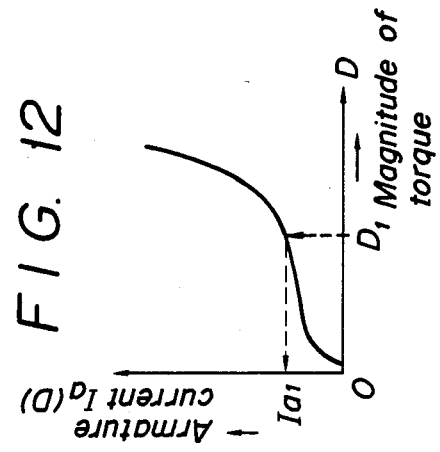
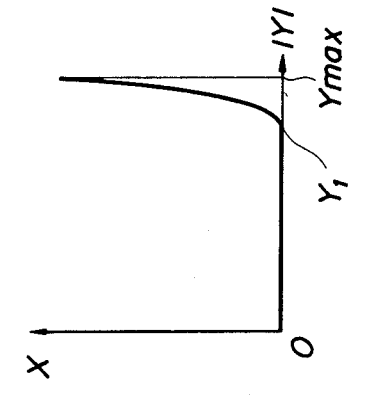
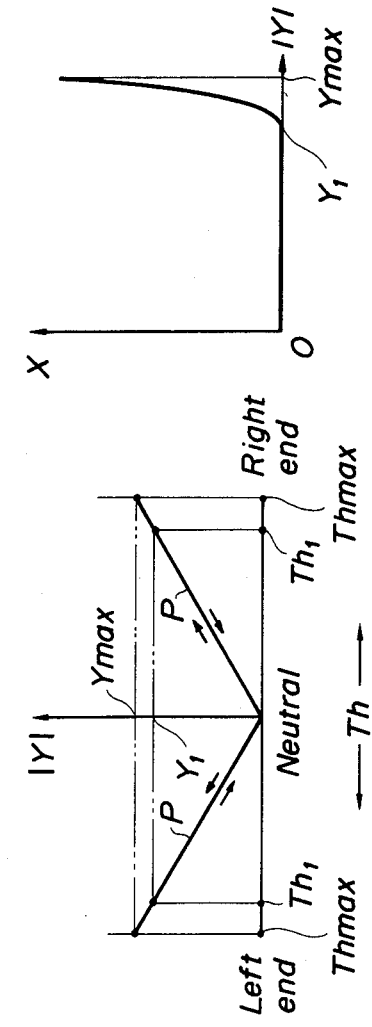
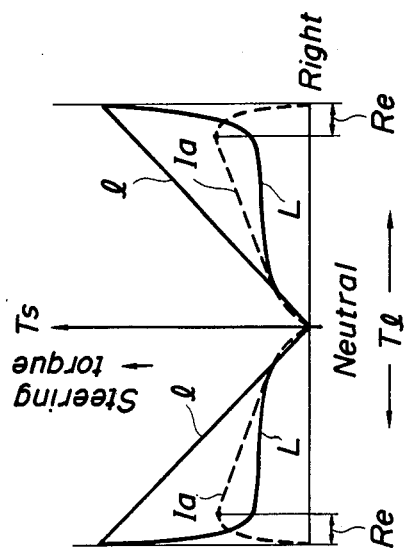
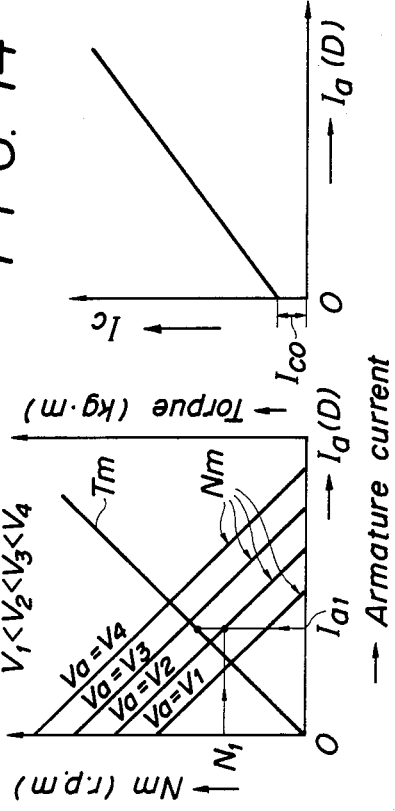

ELECTRIC POWER STEERING SYSTEM FOR VEHICLES

This application is a continuation of application Ser. No. 827,687 filed Feb. 10, 1986, now abandoned.

BACKGROUND OF INVENTION

1. Field of the Invention

The present invention generally relates to power steering system for vehicles. More particularly, the invention relates to a power steering system for vehicles of an electric type which produces auxiliary torque for steering by means of a steering servo unit using an electric motor.

2. Description of Relevant Art

In view of problems on the hydraulic type power steering system such as that the structure thereof is complicated, recent years have proposed a variety of electric type power steering systems for vehicles.

Exemplarily, in Japanese Patent Application Lay-Open Print No. 59-70257, laid open on Apr. 20, 1984, there is disclosed an electric power steering system for vehicles.

This electric power steering system for vehicles includes an input shaft as a steering shaft connected to a steering wheel, an output shaft interconnected through a universal joint with the input shaft and through a gear mechanism of a rack and pinion type with a tie rod of a steered wheel, an electric motor supplying auxiliary torque through a reduction gearing to the output shaft. A torque detection mechanism is disposed on the input shaft to detect steering torque acting on the input shaft, and a driving control circuit produces, based on a detection signal from the torque detection mechanism, a torque magnitude signal and a torque direction signal representing the magnitude and the direction of the steering torque acting on the input shaft, respectively, and to feed the electric motor with an armature current in proportional relation to the quantity to the torque magnitude signal and in accordance to the direction of conduction with the torque direction signal. The torque detection mechanism consists of a strain gauge sensor.

With such an arrangement, when the steering wheel is operated, the output shaft is applied with adequate auxiliary torque from the electric motor, so that the steering operation is facilitated.

In such electric power steering systems as according to the aforementioned Japanese Lay-Open Print, however, like the case of ordinary manual steering systems without assist power, there is employed a steering gear mechanism in which, when a steering wheel is rotated in either direction, clockwise for example, by a predetermined angle from a neutral position thereof, a rack, at the output side, is positioned at a corresponding one of the stroke ends thereof, keeping the steering wheel from being further rotated n the same direction. In general, the predetermined angle is approximately 540°, or corresponds to approximately one and half revolutions of the steering wheel.

In electric power steering systems of such type as according to the aforementioned Japanese Lay-Open Print, therefore, at the stroke ends of an output-side rack, that is, at both steering ends of a steering wheel, it is rather desirous to reduce or stop producing auxiliary torque by an electric motor. Such a desire is raised from the viewpoint that the electric motor itself, as well as the entirety of electric power steering system, should have its durability elevated and electric power consumption decreased.

The present invention has been made to successfully achieve such desideratum in conventional electric power steering systems of the type described.

SUMMARY OF THE INVENTION

Accordingly, an object of the present invention is to provide an electric power steering system for vehicles in which, under such conditions that a steering wheel is rotated close to either of the steering ends thereof, the development of auxiliary torque by an electric motor is at least reduced, whereby the electric motor itself as well as the entirety of the steering system is permitted to have its durability elevated and electric power consumption decreased.

To achieve such an object, the present invention provides, an electric power steering system for vehicles including an input shaft operatively connected to a steering wheel, an output shaft operatively connected to a steered wheel, an electric motor for operatively supplying auxiliary torque to the output shaft, a means for detecting steering torque acting on the input shaft, and a driving control means for feeding the electric motor with a motor drive signal in consideration of an output signal from the steering torque detecting means. An improvement comprises a means for detecting a steering angle of the steering wheel, and a correction means for operatively correcting to decrease the motor drive signal, to thereby reduce the auxiliary torque to be developed at the electric motor, under the condition that the steering angle of the steering wheel is detected to be exceeding a predetermined angle by the steering angle detecting means.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings:

FIG. 2 is a cross-sectional view along line II—II of FIG. 1;

FIG. 3A is a cross-sectional view showing a mobile ferrous member of a steering torque sensor in the electromagnetic servo device, along line III—III of FIG. 1;

FIGS. 3B and 3C are a side and top views of the mobile member of FIG. 3A, respectively;

FIG. 4 is a cross-sectional view showing a steering rotation sensor in the electromagnetic servo device, along line IV—IV of FIG. 1;

FIG. 5 is a cross-sectional view along line V—V of FIG. 1;

FIGS. 9A and 9B are schematic flowcharts of main loop processes and interrupt processes, respectively, to be performed at a micro-computer unit in the control circuit of FIG. 6;

FIG. 10 is a graph showing a relation between an integral value of steering angle representative output pulses from the steering rotation detecting circuit and a steering angle;

FIG. 11 is a graph showing a relation between the integral value of the steering angle representative pulses and a correction value for an unloading process;

FIG. 12 is a graph showing a basic relation between a steering torque signal and an armature current of an electric motor of the electromagnetic servo device;

FIG. 13 is a graph for describing operational characteristics of the electric motor of the electromagnetic servo device showing relations among armature current, revolution number, and load torque of the motor;

FIG. 14 is a graph showing a relation between the armature current of the electric motor and a drive current of a magnetic clutch of the electromagnetic servo device;

FIG. 15 is a graph showing a relation between a load torque imposed on and a steering torque acting on the electromagnetic servo device.

DETAILED DESCRIPTION OF THE PREFERRED EMBODIMENT

Figure 1:
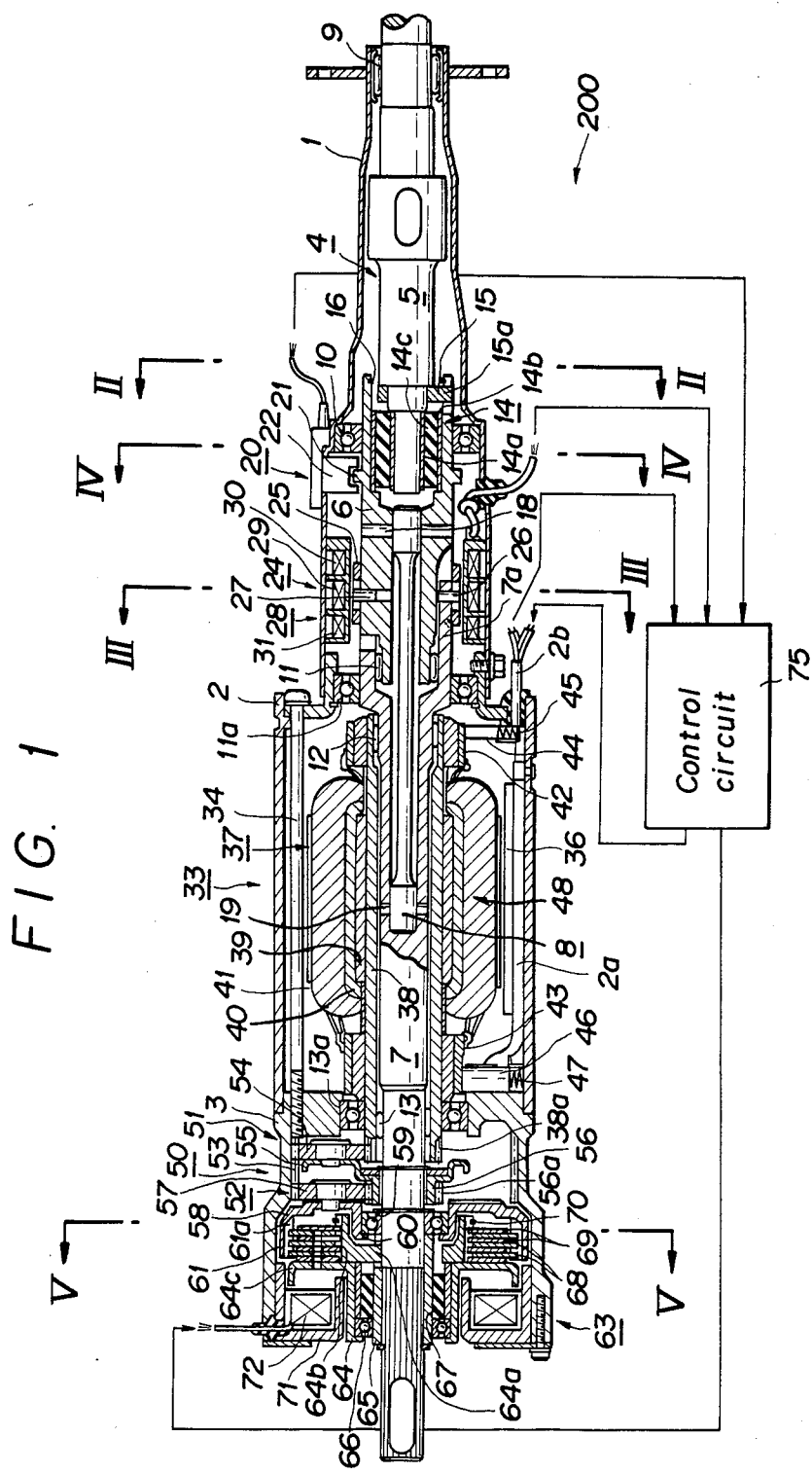
FIG. 1 is a longitudinal quarter-cutaway section view of an electromagnetic servo device as an essential part of an electric power steering system for vehicles according to a preferred embodiment of the present invention.

Referring first to FIG. 1, designated at reference numeral 200 is then entirely of an electromagnetic servo device as an essential part of an electric power steering system for vehicles according to a preferred embodiment of the present invention, as it is equipped in a vehicle (not shown). The servo device 200 includes an input shaft 4 connected at the right end thereof in FIG. 1 to a steering wheel (not shown) of the steering system. A steering column 1 accomodates therein the input shaft 4. The steering column 1 is fixed to a body (not shown) of the vehicle. An output shaft 7 is connected at the left end thereof in FIG. 1 to a steering gearbox (not shown) for steered wheels (not shown) of the vehicle. The output shaft 7 is coaxially arranged relative to the input shaft 4. A casing 3 accommodates therein the output shaft 7, and a stator 2, of a later-detailed electric motor 33, is integrally joined to the column 1 and the casing 3.

The input shaft 4 is loose-fitted at the axially innermost part thereof in the axially innermost parts of the output shaft 7, while those innermost parts of the shafts 4, 7 are interconnected with each other through a torsion bar 8 arranged coaxial with the shafts 4, 7. The input and the output shafts 4, 7 are rotatably held in position by means of a pair of bearings 9, 10 and a triple of bearings 11, 12, 13 respectively.

The electromagnetic servo device 200 is constituted with a steering rotation sensor 20 arranged around the input shaft 4. A steering torque sensor 24 is arranged around the loose-fitted innermost parts of the input and the output shafts 4, 7. The electric motor 33 of a direct-current type is coaxially arranged around the output shaft 7 and to supply auxiliary torque to the shaft 7 as will be described later. Also provided are a reduction gearing 50, an electromagnetic clutch 63, and a control device as a control circuit 75 for driving to control the electric motor 33 and the electromagnetic clutch 63 in accordance with respective detection signals output from the steering rotation sensor 20 and the steering torque sensor 24.

More particularly, the input shaft 4 is separated into a first shaft 5 and a tubular second shaft 6. The first shaft 5 has at the axially outer end thereof, that is, at the right end thereof in FIG. 1 the steering wheel secured thereto, as described, and is connected at the axially inner end thereof to the tubular second shaft 6 through a rubber bush 14 interposed therebetween for preventing the transmission of vibrations. The rubber bush 14 consists of a radially inner and an outer metallic tubes 14a, 14b, and an elastic member 14c interposed therebetween. The inner tube 14a is fixed on the first shaft 5, and the outer tube 14b, in the second shaft 6.

Further, as shown in FIG. 2, at the axially inner end part of the first shaft 5 there is fixedly fitted thereon an annular member 15 having a pair of radially outward projections 15a circumferencewise spaced apart from each other. The projections 15a are inserted in a pair of slots 6a, with a proper angular gap left, respectively. The slots 6a are formed at the axially outer end of the second shaft 6, that is, at the right end thereof in FIG. 1. The first and second shafts 5, 6 elastically interconnected with each other by the rubber bush 14, are thus permitted, by the gaps, to be angularly displaced relative to each other and by the annular member 14, to be locked relative to each other after a predetermined relative angular displacement therebetween, so that the elastic member 14c is prevented from being subjected to larger torques than predetermined in the twisting direction thereof. A circle clip 16 prevents the annular member 15 from coming out of place.

Furthermore, as shown in FIGS. 3A to 3C, the second shaft 6 has, at the axially opposite end thereof, that is at the left end thereof in FIG. 1, a pair of axially extending grooves 17 formed therein at an angular interval of 180°, while the output shaft 7 has, in the axially innermost part thereof, which is enlarged in diameter and supported by the stator 2 through a bearing 11a, a pair of axially extended projections 7a formed at respective positions corresponding to the grooves 17 of the second shaft 6. The projections 7a are inserted in the grooves 17, leaving a predetermined gap, respectively. Moreover, at the same end, the second shaft 6 is reduced, and this reduced part is inserted in, to be supported by, the enlarged innermost part of the output shaft 7.

In respective axially inner end portions of the second shaft 6 and the output shaft 7, there are formed opposing axial holes coaxial relative to each other to have coaxially disposed therein the torsion bar 8, which is secured at one end thereof (at the right end thereof in FIG. 1) by a pin 18 to the second shaft 6 at the axially opposite end by another pin 19 to the output shaft 7. The axially outer end of the output shaft 7 is interconnected, by means of splines formed thereon, with the steerig gearbox as a member at the loading side, as described.

Accordingly, steering torque applied from the steering wheel to the input shaft 4 is transmitted through deformation of the torsion bar 8 to the output shaft 7 as well as to members at the loading side. In this respect, the rubber bush 14 is interposed between the first and the second shafts 5, 6 of the first shaft 4 is set more rigid or harder to form than the torsion bar 8 interposed between the second shaft 6 and the output shaft 7.

As shown in FIG. 4, the steering rotation sensor 20 comprises a plurality of radially toward projections 21 as teeth equi-angularly spaced apart along the circumference of the second shaft 6, and a pair of photo-couplers 22a, 22b fixed to the steering column 1 is such a manner that each of them has its coupled parts at both axial sides of the radial projections 21. In the sensor 20 with such an arrangement, the coupling by a light beam at each of the photo-couplers 22a, 22b is alternatively interrupted and made, by the projections 21 and gaps 21a therebetween respectively as the steering wheel is rotated by operations.

Figure 7:
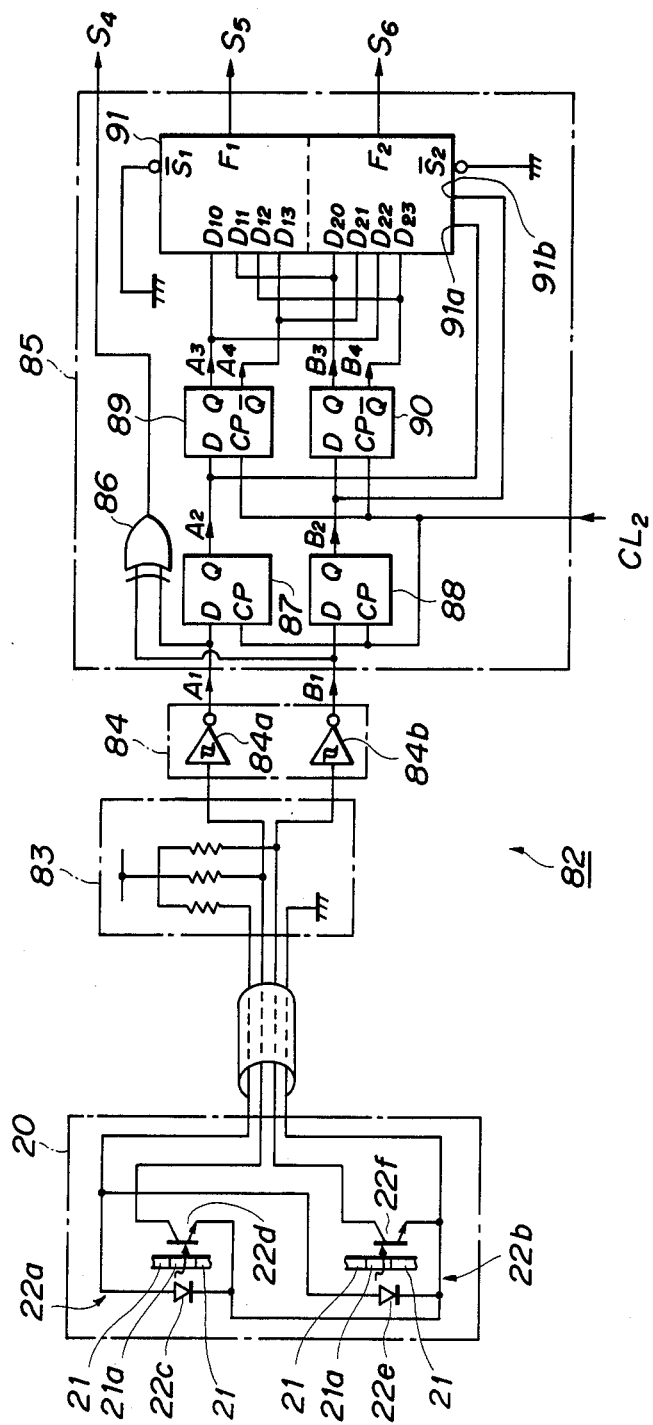
FIG. 7 is a further detailed diagram of a steering rotation detecting circuit in the control circuit of FIG. 6.

In this respect, as shown in FIG. 7, the photo-couplers 22a, 22b comprise light emitting elements 22c, 22e consisting of LED's, respectively, and light-receiving elements 22d, 22f consisting of photo-transistors.

Respective positions of the photo-couplers 22a, 22b are determined such that the periods in detection of the projections 21 and the gaps 21a are shifted in phase either from the other by a predetermined value, one-fourth of each cycle in this embodiment.

More particularly, the circumferential width of each of the projections 21 and that of each of the gaps 21a are set equal to each other and, when this is W, the positions of the photo-couplers 22a, 22b are circumferencewise spaced apart from each other by a distance of $(n+\frac{1}{4}) \times 2W$, where n is an integer, the unity in this embodiment.

Accordingly, as the second shaft 6 is rotated by operation of the steering wheel in either direction, the phototransistors 22d, 22f output a pair of electric signals shifted in phase from each other by $\frac{1}{4}$ cycle.

The steering torque sensor 24 comprises a differential transformer consisting of a mobile tubular ferrous core member 25 axially slidably fitted around the mutually engaged innermost parts of the second shaft 6 of the input shaft 4 and the output shaft 7, and a winding part 28. As shown in FIGS. 3A to 3C, the mobile core member 25 has formed therethrough a pair of first elongate holes 25a engaged with a pair of pins 26 radially projecting from the axial projections 7a of the output shaft 7 and a pair of second elongate holes 25b engaged with another pair of pins 27 axially projecting from the second shaft 6. These radial pins 27 are each respectively angularly spaced apart at 90° from either of those radial pins 26. The first elongate holes 25a are formed in the axial direction of the core member 25, and the second elongate holes 25b, inclined at a necessary angle with respect to the axis of the member 25. As a result, in accordance with an angular difference circumferencewise developed between the second shaft 6 and the output shaft 7, the inclined elongate holes 25 cooperate with the pins 26 engaged therewith to cause the mobile core member 25 to move in the axial direction, so that the core member 25 is displaced in accordance with steering torque acting on the input shaft 4 or the second shaft 6 thereof.

More particularly, in the case where, exemplarily providing that steering torque is applied to the second shaft 6 in the clockwise direction when viewed at the side of the steering wheel and a load torque larger than the steering torque is imposed on the output shaft 7, the second shaft 6 is thus rotated relative to the output shaft 7 in the clockwise direction when viewed at the side of the steering wheel, then the mobile core member 25 is caused to move upwardly n FIG. 3C, that is, rightwardly in FIG. 3B or leftwardly in FIG. 1.

To the contrary, in the case where the second shaft 6 is rotated relative to the output shaft 7 in the counter-clockwise direction when viewed at the side of the steering wheel, then the core member 25 is caused to move in the opposite direction to the above.

In either of the foregoing cases, due to the inclined elongate holes 25b of the mobile core member 25 engaged with the radial pins 26 provided at the side of the output shaft 7, which holes 26 are so shaped as to have a straight-linear form when the tubular core member 25 is developed, the core member 25 has an axial displacement in the moving direction from an original middle or neutral position thereof in proportion to the circumferencewise relative angular displacement between the second shaft 6 and input side member and the output shaft 7.

In this respect, the mobile core member 25 is located at the middle position under the condition that no steering torque is acting on the input shaft 4 and hence the relative angular displacement between the second shaft 6 and the output shaft 7 is kept zero. In the state shown in FIGS. 1 an 3A to 3C, the core member 25 is supposed to be located at such a middle position.

Further, in the differential transformer, the winding part 28 arranged around the mobile core member 25 is constituted with a primary winding 29 having a pulse signal input thereto, and a pair of secondary windings 30, 31 coaxially disposed at both sides of the primary winding 29 and produce an output signal corresponding to the axial displacement of the core member 25. Accordingly, as the relative angular displacement between the second shaft 6 and the output shaft 7 develops with deformation of the torsion bar 8, the axial displacement of the mobile core member 25 is transduced into electric signals to be output.

The electric motor 33 comprises the stator 2 of a cylindrical form integrally joined by means of bolts 34 to both the steering column 1 and the casing 3. The stator 2 has at least one pair of magnets 36 fixed to the inside thereof. A rotor 37 is rotatably arranged around the output shaft 7. The rotor 37 includes a tubular shaft 38 free-rotatably fitted on the output shaft 7 by means of needle bears 12, 13 interposed therebetween and likewise supported by the casing 3 through a ball bearing 13a, and an armature assembly integrally fixed on the tubular shaft 38. The assembly consists of a laminated ferrous core 39 having skew slots formed therein for placing a first multiple winding 40 and a second multiple winding 41 to be laid thereon, with a fine air gap left between the magnets 36 and the second winding 41. Moreover, the tubular shaft 38 has fixed thereon a first commutator 42 connected to the first multiple winding 40 and a second commutator 43 connected to the second multiple winding 41. Further, a set of brushes 44 is forcibly put in contact with the first commutator 42 and another set of brushes 46 is likewise put in contact with the second commutator 43. The two sets of brushes 44 and 46 are accommodated in brush holders 45, 47 fixed to the stator 2, respectively. The brushes 44, 46 have leading wires thereof taken out of the stator 2 through non-magnetic pipes 2a, 2b, respectively. In the foregoing arrangement, the magnets 36, the first multiple winding 40, the first commutator 42, and the brushes 44 are cooperating to constitute a direct-current generator 48 as a motor speed sensor for detecting the number of revolutions per unit time of the rotor 37 of the electric motor 33. The generator 48 is thus to be employed for giving an output signal of a direct-current voltage proportional to the revolution number of the rotor 37. On the other hand, as well as the magnets 36, the second multiple winding 41, the second commutator 43, and the brushes 46 are cooperating to constitute a proper electrical part of the electrical motor 33 for producing auxiliary torque.

The reduction gearing 50 comprises two stages 51, 52 of planetary gear arranged around the output shaft 7. As shown in FIG. 1, the primary stage 51 consists of a primary sun gear 38a formed along the outer circumference of the left end part of the tubular shaft 38, the right half of a common ring gear 53 formed along the inner circumference of the casing 3, a triple of primary planet gears 54 interengaged between the sun and the ring gears 38a, 53, and a first carrier member 55 for pivotally supporting the planet gears 54. The carrier member 55 is loose-fitted on the output shaft 7. The secondary stage 52 consists of a secondary sun gear 56a formed along the outer circumference of a tubular member 56 integrally joined with the first carrier member 55, the left half of the common ring gear 53, a triple of secondary planet gears 57 interengaged between the sun and the ring gears 56a, 53, and a second carrier member 58 for pivotably supporting the planet gears 57. Carrier member 58 has integrally formed at the radially inner side, an inner tubular portion 60 supported by the output shaft 7 through a bearing 59. At the radially outer side of carrier 58, an outer tubular portion 61 extends along the inner circumference of the casing 3. The outer tubular portion 61 is provided with inner teeth 61a formed along the inner circumference thereof. Therefore, when the rotor 37 of the electric motor 33 rotates, the rotation of the rotor 37 is transmitted through the tubular shaft 38, the primary sun gear 38a, the primary planet gears 54, the first carrier member 55, the secondary sun gear 56a, and the secondary planet gears 57 to the second carrier member 58 and thus to the outer tubular portion 61 thereof, while being reduced in speed.

In the electromagnetic clutch 63, a rotor 64 thereof is rotatably supported through a bearing 66 on a ring member 65 which is spline-fixed on the output shaft 7, while the rotor 64 is elastically connected to the output shaft 7 by means of a ring-like elastic member 67 for absorbing torsional vibrations. The rotor 64 of a tubular form is provided with an axial extension extended as it surrounds the inner tubular portion 60 of the second carrier member 58. The extension has a pair of projections 64a radially inwardly projecting from the inner circumference thereof toward the outer circumference of the output shaft 7. As shown in FIG. 5, the radial projections 64a are inserted in a pair of slots 65a formed in the ring member 65, with a necessary circumferential gap left therebetween, respectively, so as to have an angularly engaged relation to the ring member 65. Accordingly, the rotor 64 is kept elastically interconnected with the output shaft 7 within a relatively angular displacement therebetween corresponding to the circumferential gap or before the projections 64a of the rotor 64 are brought into abutment with the ring member 65. The axial extension of the rotor 64 has along the outer circumference thereof outer teeth 64b formed thereon, and further the rotor 64 has, at a position thereon at the opposite end of the axial extension thereof relative to the second carrier member 58, a disc-like support plate portion 64c projecting in the radial direction. Between the support plate portion 64c of the rotor 64 and the second carrier member 58, there are alternately disposed a plurality of disc-like plates 68 having cut in the outer circumferences thereof grooves meshing with the inner teeth 61a of the outer tubular portion 61 of the carrier member 58 and a plurality of disc-like plates 69 having cut in the inner circumferences thereof grooves meshing with the outer teeth 64b of the axial extension of the rotor 64, thereby constituting a multi-plate clutch mechanism. In FIG. 1, designated at reference numeral 70 is a stopper of the plates 69.

Moreover, at the axially outer end of the casing 3 is provided an annulus 71 fixed therein, which has a channel-like cross section. The annulus 71 has accommodated therein an annular excitation coil 72 electrically connected through a leading wire to the control device 75. Thus, with current conduction through the excitation coil 72, there is developed a field of electromagnetic force to thereby attract, through an unshown suitable implement, the aforementioned plates 68, 69 all together toward the coil 72, so that the auxiliary torque, having been transmitted form the electric motor 33 to the outer tubular portion 61 of the second carrier member 58 in a speed-reducing manner through the reduction gearing 50, can normally be further transmitted through the multi-plate clutch mechanism consisting of the elements 61a, 68, 69, and 64b, the rotor 64, and the elastic member 67 to the output shaft 7.

In this respect, in a state in which the rotor 64 has been rotated relative to the output shaft 7 until the relative angular displacement therebetween reaches a predetermined value, the radial projections 64a from the axial extension of the rotor 64 are put into abutment with corresponding side faces of the slots 65a in the ring member 65, so that the auxiliary torque by the electric motor 33 is mechanically transmitted from the rotor 64 to the output shaft 7 in a non-elastic manner.

Description will now be made of the control device 75 as a control circuit of the electromagnetic servo device 200, with reference to FIG. 6.

Figure 6:
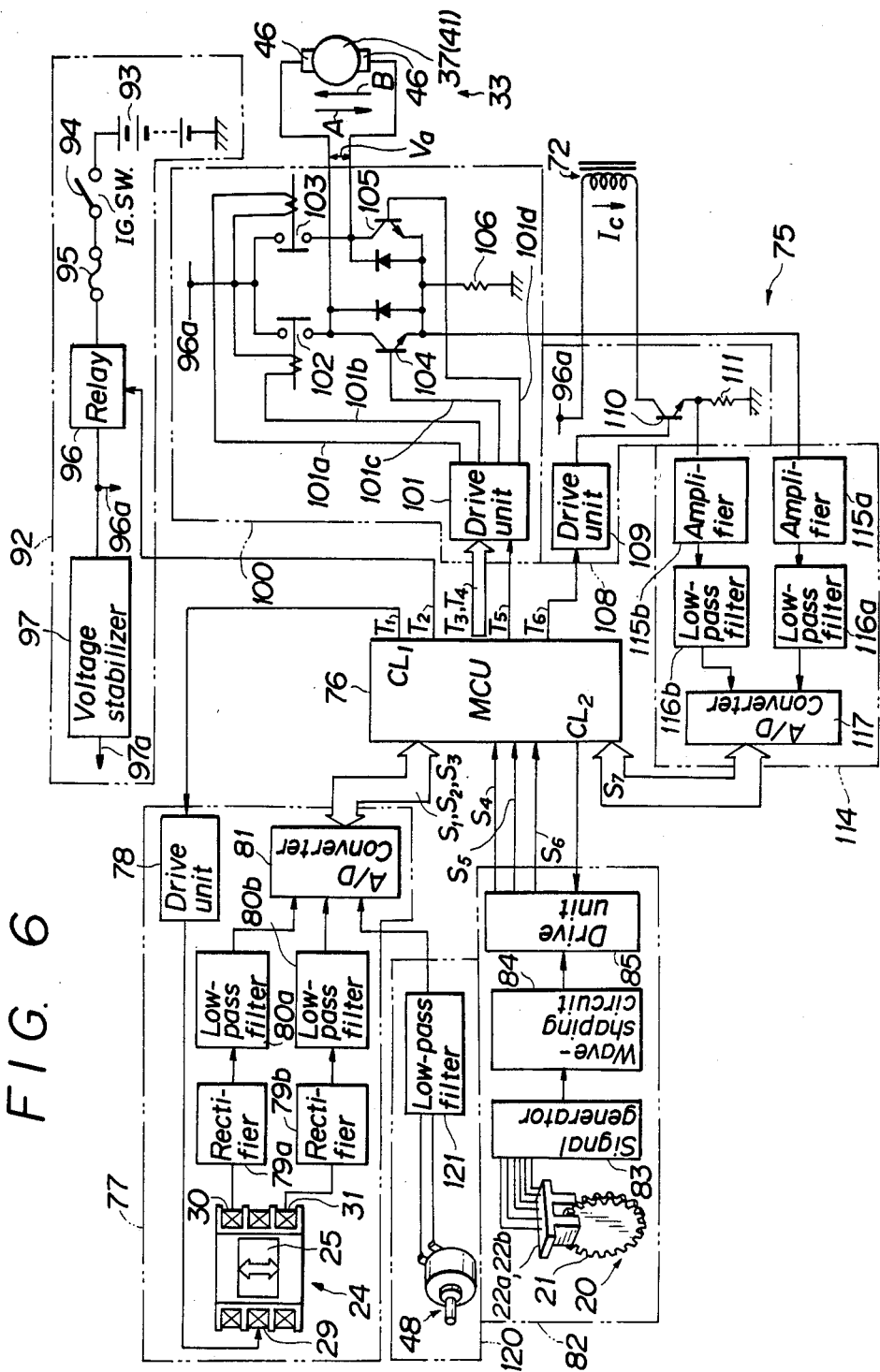
FIG. 6 is a detailed diagram of a control circuit of the electromagnetic servo device.

In FIG. 6, designated at reference number 76 is a microcomputer unit. The micro-computer unit 76 has input thereto respective detection signals $S_1$ to $S_7$ output from a steering torque detection circuit 77, a steering rotation detection circuit 82, a motor speed detection circuit 120, and an abnormality detection circuit 114.

The steering torque detection circuit 77 comprises the aforementioned steering torque sensor 24, a drive unit 78 for outputting a reference clock pulse $T_1$ in the micro-computer unit 76, while dividing the clock pulse at a number of stages, to the primary winding 29 of the steering torque sensor 24. A pair of rectifiers 79a, 79b, rectifies respective analog electric signals given from the secondary windings 30, 31 of the torque sensor 24 in accordance with the axial displacement of the mobile core member 25 of the sensor 24. A pair of low-pass filters 80a, 80b eliminates high frequency components of those signals as rectified, and an A/D (analog to digital) convertor 81 converts respective analogue electric signals from the low-pass filters 80a, 80b into a pair of digital signals to be output as steering torque signals $S_1$, $S_2$ to the micro-computer unit 76.

The motor speed detection circuit 120 comprises the aforementioned generator 48 as a motor rotation speed sensor, and a low-pass filter 121 for eliminating high-frequency components of an analog voltage signal output from the generator 48. An analog voltage signal output from the low-pass filter 121 is input to the A/D converter 81, where it is converted into a digital signal to be output as armature speed signal $S_3$ representing the rotation speed of the armature 37 corresponding to the number Nm of the revolutions per minute thereof. As explained later, the motor speed detection circuit 120 functions as a feedback signal generator.

As shown in FIGS. 6 and 7, the steering rotation detection circuit 82 comprises a signal generator 83 to apply electric power to the photo-couplers 22a, 22b of the steering rotation sensor 20 to thereby output the aforementioned electric signals therefrom, a wave-shaping circuit 84 consisting of a pair of Schmidt trigger circuits 84a, 84b for adequately shaping the waveform of the output signals from the signal generator 83, and a drive unit 85. The drive unit 85 consists of a quadruplet of flip-flops 87, 88, 89, 90 of a D type that functions with a clock pulse given from a terminal $CL_2$ of the micro-computer unit 76, a multiplexer 91 of a double four-channelled-circuit type, and an exclusive-OR circuit 86.

Figure 8:
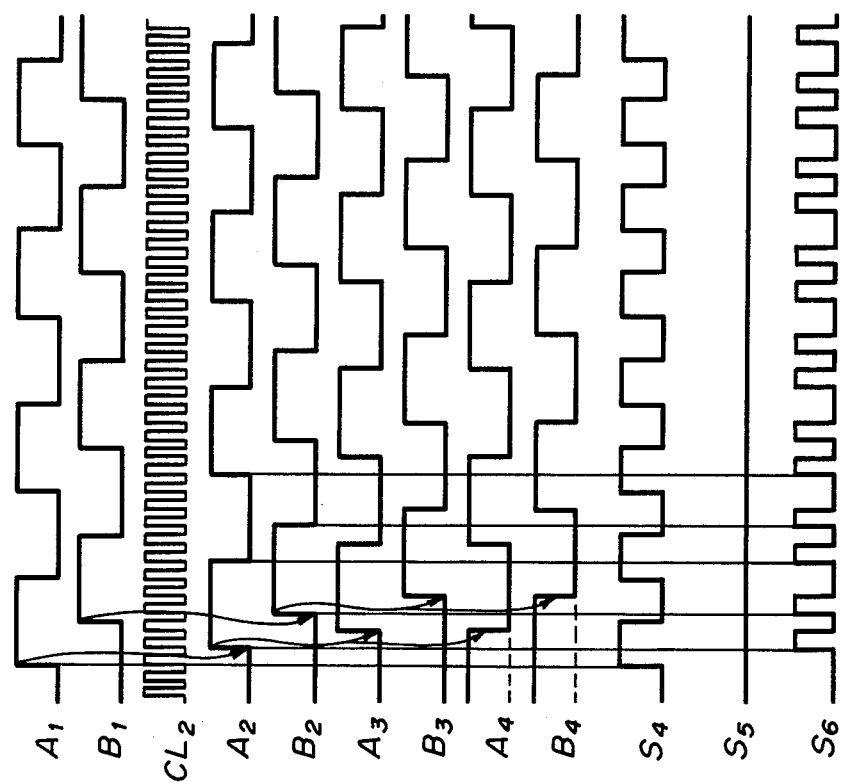
FIG. 8 is a time chart of output signals at various parts of the circuit of FIG. 7.

At the steering rotation detection circuit 82 with such an arrangement, in the case where, with the steering wheel rotated clockwise for example, the projections 21 as a light-shielding parts and the gaps 21a as light-transmitting parts therebetween are rotated in the clockwise direction as viewed at the side of the steering wheel, it so follows that the photo-transistors 22d, 22f, cooperating with each other with a differential of ¼ cycle in phase, receive those beams of light which are projected from the LED's 22c, 22e and transmitted from time to time through corresponding one of the light-transmitting parts 21a and the next one thereto, respectively. Therefore, in this case, the aforementioned output signal from the photo-transistor 22f is delayed by ¼ cycle in phase from that of the photo-transistor 22d. As a result, the detection circuit 82 has at various parts thereof such output signals as shown in FIG. 8, whereas detailed description will be given later.

The multiplexer 91 functions in accordance with a truth table as shown below.

| Select Terminals | | | Outputs |
|---|---|---|---|
| $S_n$ | 91b | 91a | $F_n$ |
| H | X | X | L |
| L | L | L | $D_{n0}$ |
| L | L | H | $D_{n1}$ |
| L | H | L | $D_{n2}$ |
| L | H | H | $D_{n3}$ |

In the table above, reference character H represents "high" level, and L "low" level. X may be either of H and L, and the suffix n=1 or 2.

With reference to FIGS. 7 and 8, description will now be made of various interrelations among output signals $A_1$ to $A_4$, $B_1$ to $B_4$ and $S_1$ to $S_6$ at essential parts of the steering rotation detection circuit 82.

As described, in the detection circuit 82, the drive unit 85 is supplied with the clock pulse from the terminal $CL_2$ of the micro-computer unit 76. The signal is obtained by dividing the system clock $T_1$ of the unit 76 at a predetermined number of stages.

When the steering wheel is rotated, exemplarily clockwise as described, the aforementioned electric signals shifted one from the other by ¼ cycle are input from the signal generator 83 to the wave-shaping circuit 84, where the Schmidt trigger circuits 84a, 84b produce rectangular pulse signals $A_1$, $B_1$ to be output, respectively. The signals also are different in phase by ¼ cycle from each other. In the exemplar case shown in FIG. 8, the signal $B_1$ output from the circuit 84b is delayed by ¼ cycle from the output signal $A_1$ of the circuit 84a.

The pulse signals $A_1$, $B_1$ are input to D terminals of flip-flops 87, 88, respectively, which are triggered so as to have output signals $A_2$, $B_2$ thereof delayed from the signals $A_1$, $B_1$, in rise/fall, for a period of one cycle of the clock pulse from the terminal $CL_2$, at maximum, respectively.

Moreover, the output signal $A_2$ of the flip-flop 87 is input to the D terminal of the next flip-flop 89, which is triggered to have an output signal $A_3$ at a Q terminal thereof delayed from the signal $A_2$, in rise/fall, for a period of one cycle of the clock pulse from the terminal $CL_2$, at maximum, while it concurrently outputs at a $\overline{Q}$ terminal thereof an inverted signal $A_4$ that is reversed in level with respect to the signal $A_3$.

Likewise, the output signal $B_2$ of the flip-flop 88 is input to the D terminal of the next flip-flop 90, which is triggered to have an output signal $B_3$ at the Q terminal thereof delayed from the signal $B_2$, in rise/fall, for a period of one cycle of the clock pulse from the terminal $CL_2$, at maximum, while it concurrently outputs at a $\overline{Q}$ terminal thereof an inverted signal $B_4$ that is reversed in level with respect to the signal $B_3$.

Then, the output signals $A_3$, $A_4$, $B_3$, $B_4$ are sent to input terminals $D_{10}$, $D_{11}$, $D_{12}$, $D_{13}$, $D_{20}$, $D_{21}$, $D_{22}$, $D_{23}$, of the multiplexer 91 with such connections as shown in FIG. 7. Among select terminals 91a, 91b, $\overline{S}_1$, $\overline{S}_2$ of the multiplexer 91, the latter two $\overline{S}_1$, $\overline{S}_2$ are grounded.

The multiplexer 91, of which logic is as shown in the truth table given before, has at output terminals $F_1$, $F_2$ signals $S_5$, $S_6$ of such waveforms as shown in FIG. 8, respectively. More particularly, in the case shown in FIG. 8, the signal $S_5$ is continuously kept at a "low" level, while the signal $S_6$ has four rectangular pulses appearing within one cycle of the output signal $A_1$, or more correctly, within that of the output signal $A_2$.

Further, in the drive unit 85 of the steering rotation detection circuit 82, the output signals $A_1$, $B_1$ of the waveshaping circuit 84 are input to the exclusive-OR circuit 86, which in turn outputs signal $S_4$ that has two rectangular pulses appearing within one cycle of the signal $A_1$, as shown in FIG. 8.

It is advised that the time chart of FIG. 8 corresponds to the case of clockwise rotation of the steering wheel, as described.

In the case where the steering wheel is rotated counterclockwise, then respective pulses in the signal $A_1$ are delayed by ¼ cycle from corresponding pulses in the signal $B_1$ and depending thereon, other signals $A_2$ to $A_4$, $B_2$ to $B_4$, and $S_4$ to $S_6$ are output. In this case, therefore, the waveforms of the signals $S_5$, $S_6$ as shown in FIG. 8 are interchanged therebetween, while that of the signal $S_4$ is maintained.

The duration of those pulses which appear in the signals $A_1$, $B_1$ are quasi-original detection signals in reverse proportion to a steering speed Ns of the steering wheel.

As understood from the foregoing description, between the output signals $S_5$ and $S_6$ of the steering rotation detection circuit 82, only the latter $S_6$ has pulses appearing therein if the steering wheel is rotated clockwise and the former $S_5$ does if the rotation of the steering wheel is counterclockwise.

The output signals $S_4$ to $S_6$ of the steering rotation detection circuit 82 are input to the micro-computer unit 76, and more particularly, to three unshown counters therein, respectively, while also the clock signal represented by the terminal $CL_2$ is input to another unshown counter in the unit 76. In the micro-computer unit 76, the input signal $S_4$ from the detection circuit 82 is employed as a signal for computing the steering speed Ns, and the input signals $S_5$ and $S_6$ therefrom, as signals for computing a steering angle Th of the steering wheel.

The micro-computer unit 76 comprises necessary unshown I/O (input and output) ports, memory, processor, and controller.

For driving the micro-computer 76 as well as other circuits, there is provided an electric power circuit 92 comprising a normally-closed relay 96, which is installed in a power line from a positive terminal of a battery 93 mounted on the vehicle through a key switch 94 of an ignition switch IG.SW and a fuse 95, and a voltage stabilizer 97 to which electric power is supplied through the relay 96. The relay 96 is provided with an output terminal 96a for applying electric power from the battery 93 to an electric motor drive circuit 100 and an electromagnetic clutch drive circuit 108, and the voltage stabilizer 97, with an output terminal 97a for applying stabilized power to the micro-computer unit 76 and other circuit elements. Therefore, while the key switch 94 is turned on, the micro-computer unit 76 is put in an energized state thereof, where it is permitted to process the respective input signals $S_1$ to $S_7$, following a program stored in the memory, to output a triple of control signals $T_3$, $T_4$, $T_5$ to be used for driving the electric motor 33 and a clutch current control signal $T_6$ to be used for driving the electromagnetic clutch 63 to the motor drive circuit 100 and the clutch drive circuit 108, respectively, to thereby control the driving of the motor 33 and the clutch 63. Among those control signals, $T_3$ and $T_4$ are a clockwise rotation representative and a counterclockwise rotation representation signals, respectively, responsible for determining the terminal polarity of an armature voltage Va to be applied to the electric motor 33 in correspondence to the steering direction of the steering wheel, and $T_5$ is a voltage control signal responsible for determining the armature voltage Va.

The electric motor drive circuit 100 comprises a drive unit 101, and a bridge circuit consisting of a pair of relays 102, 103, and a pair of npn transistors 104, 105. In the bridge circuit, the relays 102, 103 have a common supply terminal thereof connected to the output terminal 96a of the relay 96 of the power circuit 92, and the transistors 104, 105 have the emitters thereof connected through a resistor 106 to ground as a common side. Respective excitation coils of the relays 102, 103 and the bases of the transistors 104, 105 are connected to output terminals 101b, 101a and 101c, 101d of the drive unit 101, respectively. The collectors of the transistors 104, 105 are cooperating with each other to provide a potential difference to be applied as the armature voltage Va through the aforementioned brushes 46, 46 across the second multiple winding 41 as an armature winding of the electric motor 33.

The drive unit 101 of the motor drive circuit 100 is for driving the relay 102 or 103 and the transistor 105 or 104 in accordance with the rotation direction representative control signals $T_3$, $T_4$ and for outputting a pulse signal, as a series of PWM (pulse duration modulation) waves obtained by modulating the duration of a rectangular-pulse signal of constant frequency in accordance with the voltage control signal $T_5$, to the base of either of the transistors 104, 105.

Accordingly, in a state in which, being given the steering torque representative detection signals $S_1$, $S_2$ as they are representing steering torque of certain magnitude clockwise acting on the input shaft 4, the micro-computer unit 76 has output in a later-described manner the clockwise rotation representative and the counter-clockwise rotation representative signals $T_3$, $T_4$ as set "high" and "low", respectively, and the voltage control signal $T_5$ with a signal value corresponding to the steering torque above, then the drive unit 101 is caused to excite the relay 102 through the terminal 101b and concurrently to apply the aforementioned pulse signal, as it is duration-modulated in accordance with the value of the voltage control signal $T_5$, through a terminal 101d to the base of the transistor 105. Under such a condition, the armature voltage Va to be applied across the electric motor 33 is proportional in effective value to the duration of the modulated pulse signal and has such a terminal polarity that an armature current Ia runs in a direction A of conduction forcing the motor 13 to rotate clockwise.

In the above case, the drive unit 101 has no exciting current output through the terminal 101a and no pulse signal output through the terminal 101c, so that the relay 103 remains de-energized and the transistor 104 is off.

In a state in which steering torque of certain magnitude is counterclockwise acting on the input shaft 4 and thus the micro-computer unit 76 has output the clockwise rotation representative and the counterclockwise rotation representative signals $T_3$, $T_4$ as set "low" and "high", respectively, and the voltage control signal $T_5$ with a signal value corresponding to the steering torque, then there advances a sequence of direction-reversed processes, causing the relay 103 to be excited and concurrently the transistor 104 to be set on, so that the armature current Ia runs through the electric motor 33 in a direction B of conduction forcing the motor 33 to rotate counterclockwise.

In other words, in the electric motor drive circuit, 100, there is performed a process for controlling the direction of rotation of the electric motor 33 by selective current conduction to a combination of relay 102 and transistor 105 or an opposite combination of relay 103 and transistor 104, as well as a process for effecting a conduction period control of the transistors 104, 05 by modulating the duration of pulses to be applied to the bases of the transistors 104, 105, while applying across the electric motor 33 the armature voltage Va having an effective value corresponding to the conduction period control, whereby the motor 33 is controlled so as to produce auxiliary torque in correspondence to steering torque applied to the steering wheel.

The electromagnetic clutch drive circuit 108 comprises a drive unit 109 and an npn transistor 110. The transistor 110 is connected at the collector via the excitation coil 72 of the electromagnetic clutch 63 to the aforementioned output terminal 96a of the relay 96 in the power circuit 92, at the emitter through a resistor 111 to ground as a common side, and at the base to an output terminal of the drive unit 109. The drive unit 109 is for outputting to the base of the transistor 110 a pulse signal of which duration is modulated in accordance with the clutch current control signal $T_6$ output from the micro-computer unit 76. Accordingly, in the clutch drive circuit 108, there is performed at the drive unit 109 a process for effecting a current conduction control of the transistor 110 in accordance with the clutch current control signal $T_6$, to thereby control the torque transmission of the electromagnetic clutch 63.

As described, in the present embodiment of the invention, there is employed the abnormality detection circuit 114, which is for detecting abnormalities of the electric motor 33 and the electromagnetic clutch 63. The abnormality detection circuit 114 comprises an amplifier 115a for amplifying a voltage signal taken out from a terminal of the aforementioned resistor 106 in the motor drive circuit 100, another amplifier 115b for amplifying a voltage signal taken out from a terminal of the aforementioned resistor 106 in the motor drive circuit 100, another amplifier 115b for amplifying a voltage signal taken out from a terminal of the aforementioned resistor 111 in the clutch drive circuit 108, a pair of low-pass filters 116a, 116b for eliminating high-frequency components of output signals from the amplifier 115a, 115b, respectively, and an A/D (analog to digital) converter 117 for converting analog signals output from the low-pass filters 116a, 116b into a digital detection signal to be output as the aforementioned signal $S_7$ to the micro-computer unit 76. In this respect, this detection circuit 114 detects abnormalities of the electric motor 33 and the electromagnetic clutch 63 by checking respective terminal voltages of the resistors 106, 111. When an abnormality is detected by the circuit 114, the microcomputer unit 76 enters in a later-described manner an abnormality diagnosis process, where it functions to output a relay control signal $T_2$ to the relay 96 of the power circuit 92 to thereby interrupt the power supply to circuit elements.

There will be described below various programmed functions of the micro-computer unit 76.

FIGS. 9A and 9B are flow charts schematically showing main loop processes and interrupt processes thereto, respectively, in the micro-computer unit 76. In those Figures, designated at reference numerals 300 to 334 and 350 to 358 are associated process steps.

By turning on the key switch 94 of ignition key at the power circuit 92, the micro-computer 76 as well as other associated circuits is applied with electric power and permitted to exhibit control functions thereof.

First, the program control flow goes to initialization step 302, where first of all, by masking interrupts, various parameters and factors as well as circuits in the micro-computer unit 76 are initialized. At this moment, the counters to be fed with the output signal $S_4$ from the steering rotation detection circuit 82 and the clock signal $CL_2$, respectively, are reset as well, and also a later-described unload control permission of flag Fth is reset to "0". Thereafter, an interrupt is enabled.

In this respect, the electromagnetic servo device 200 is provided with a neutral position sensor for applying a request of interruption to the micro-computer 76, when the neutral position of the input shaft 4 is thereby detected.

The flow-chart of FIG. 9B shows, as a whole, an interruption handling routine for handling such an interrupt.

Promptly after the program has come to an interrupt step 350, the interrupt is disabled at step 352. Accordingly, thereafter, that is, after the neutral position of the input shaft 4 has been once detected under the condition that the ignition switch IG.SW. is turned on, the interrupt request from the aforementioned neutral position sensor to the micro-computer unit 76 is not acknowledged by the unit 76.

At subsequent step 354, the counters to be fed with the output signals $S_5$, $S_6$ from the steering rotation detection circuit 82, respectively, are both reset.

Further, at step 356, the content of a later-described steering angle register Y is cleared to zero.

Thereafter, at step 357, the unload control permission flag Fth is set to "1".

Upon completion of all necessary processes through the foregoing stages 352 to 357, the program returns to a main loop shown in FIG. 9A, at the next address therein with respect to that address at which the interrupt request in question is raised.

As will be understood, in the present embodiment of the invention, the interruption handling routine of FIG. 9B is programmed so as to execute a sequence of processes for detecting the neutral position of the input shaft 4 and, in consideration of the steering angle Th, for properly setting a flag, resetting counters, and clearing a register to zero.

In this respect, however, there may advantageously be employed a modified example in which, instead of executing such handling of interruption as described above, the neutral position of an input shaft is stored in a micro-computer unit at the time of fabrication of the steering system and, whether an ignition switch is turned on or off, electric power is normally applied to a circuit element for storing variations of the steering angle.

In the main loop of FIG. 9A, at step 304, the detection signal $S_1$ to $S_7$ from the respective detection circuits 77, 82, 114, 120 are input to be read and stored.

The next step 306 is a sub-routine where a diagnosis is made as to whether the detection signals $S_1$ to $S_7$ are proper or not. The diagnosis is made by checking the detection signals for abnormalities. If any abnormality is found, then the relay control signal $T_2$ is output from the micro-computer unit 76 to the relay 96, thereby interrupting the power supply from the power circuit 92, so that the power assist function of the electric power steering system stops, allowing the steering system to be operated manually.

More particularly, the control circuit 75 then stops controlling the electric motor 33. In cases where, under such condition, with steering torque applied to the steering wheel the input shaft 4 is caused to rotate in either direction, the torque transmission from the input shaft 4 to the output shaft 7 initially is effected through the torsion bar 8, giving rise to an increasing torsional deformation thereof. And, if the output shaft 7 has such load torque imposed thereon that is much larger than the steering torque so as to cause the relative angular displacement between the input and the output shafts 4, 7 to develop unit until it reaches a predetermined value, then at this time the aforementioned projections 7a of the axially innermost part of the output shaft 7 are brought into abutment with corresponding side walls of the grooves 17 formed at the inner end of the second shaft 6 of the input shaft 4, there being established an engaged relation therebetween in which the output shaft 7 is mechanically and integrally rotated with the input shaft 4 in a corresponding one direction. Such an engagement relation between the projections 7a of the output shaft 7 and the grooves 17 of the second shaft 6 of the input shaft 4 provides a fail-safe function to the electromagnetic servo device 200.

In the case the detection signals $S_1$ to $S_7$ are all normal and proper, then at a subsequent decision step 308, a comparison of signal value is made between the steering torque representative detection signals $S_1$, $S_2$ from the steering torque detection circuit 77 to thereby determine whether the steering direction of the steering torque is clockwise or counterclockwise, whereupon one of the clockwise rotation representative and the counterclockwise rotation representative $T_3$, $T_4$ should be set "high".

More particularly, at the step 308, it is determined whether or not the signal value of the clockwise steering torque representative signal $S_2$ is larger than that of the counterclockwise steering torque representative signal $S_1$. Then, if $S_2$ is larger $S_1$, the program goes to step 310, where the clockwise rotation representative signal $T_3$ is to be set "high". If $S_2$ is not larger than $S_1$, the program goes to step 312, where the counterclockwise rotation representative signal $T_4$ is to be set "high".

The program then goes to step 314, where an operation is performed to determine the magnitude D as absolute value of steering torque from the steering torque representative signals $S_1$, $S_2$, such that $D = |S_1 - S_2|$.

Subsequent to the process step 314, there is executed an unloading control process through steps 315 to 318.

More particularly, at the decision step 315, it is determined whether or not the unload control permission flag Fth is set to "1". If the flag Fth is not set "1", the program goes to step 320, where the unloading control process is prohibited, as will be described later.

In the case the flag Fth is set "1", the program goes to the next step 316, where the content of the (integrated) steering angle register Y is updated, following an arithmetic expression, such that $Y = Y + (S_5' + S_6')$, where $S_5'$, $S_6'$ are count values by the aforementioned counters of the steering angle representative detection signals $S_5$, $S_6$ input thereto and hence are always positive. Therefore, if the steering wheel is rotated clockwise from the neutral position, Y has a negative value and, if it is rotated counterclockwise from the neutral position, the value of Y is positive.

In this concern, at step 304, the clock signal $CL_2$ as well as the signals $S_1$ to $S_7$, has a count value read and stored. Moreover, counters of the signals $CL_2$, $S_4$, $S_5$, $S_6$ are cleared to zero, promptly after their count values have been read.

Between the absolute value $|Y|$ of content of the steering angle register Y and the steering angle Th, there is such a relation as illustrated by straight lines P of FIG. 10. In FIG. 10, represented by reference character Thmax is the maximum value that the steering angle Th of the steering wheel is permitted to have when the steering wheel is rotated clockwise or counterclockwise, and Th$_1$ is a predetermined value of the steering angle Th that is smaller than the maximum steering angle Thmax, while lying in the vicinity thereof. The absolute value $|Y|$ of the register Y becomes equal to the predetermined value Th$_1$ and the maximum value Thmax, when the steering angle Th is developed to the values Th$_1$ and Thmax, respectively.

At decision step 317 following the step 316, it is determined whether or not the absolute value $|Y|$ is smaller than the predetermined value Th$_1$. When $|Y|$ is smaller than Th$_1$, the steering angle Th is naturally smaller than the predetermined value Th$_1$ and hence the program goes to subsequent step 320.

However, if $|Y|$ is determined to be larger than Th$_1$ at step 317, the program goes to step 318, where a correction value X is deducted from the magnitude D of the steering torque as detected. In this respect, between the absolute value $|Y|$ of the registered Y and the correction value X of the magnitude D, there is such a relation as shown in FIG. 11. If the value of the magnitude D is thus corrected becomes negative, however, the magnitude D is set to zero. Further, when the absolute value $|Y|$ is substantially equal to the maximum steering angle Thmax, the magnitude D is set to zero irrespective of the correction value X.

At step 320, first the steering speed Ns is determined from respective count values of the clock signal $CL_2$ and the steering speed representative output signal $S_4$ of the steering rotation detection circuit 82 and then a value is determined by a memory address designation based on the steering speed Ns and the torque magnitude D for the voltage control signal $T_5$ to be used for determining the armature voltage Va, as will be described below.

The count values of the clock signal $CL_2$ and the detection signal $S_4$ may preferably be read at step 320.

How to determine the signal value of the voltage control signal $T_5$ will now be described.

The electric motor 33 is interconnected through the reduction gearing 50 and the electromagnetic clutch 63 with the output shaft 7 which is needed to be rotated substantially at the same rotation speed or angular velocity as the input shaft 4. Therefore, between the input shaft 4 and the electric motor 33, a relation exists where $Nm_i = K \times Ns_i$, where $Nm_i$ is the rotation speed in terms of the number of revolutions per unit time that the motor 33 is required to have when the input shaft 4 is rotated at a steering speed $Ns_i$, and K is the gear ratio of the reduction gearing 50 that is given in terms of the ratio of drive side speed to driven side speed. In this respect, the electromagnetic clutch 63 fundamentally is put in service so as to transmit torque from the reduction gearing 50, as it is, to the output shaft 7, while the excitation current Ic to the clutch 63 is controlled in a later described manner.

Necessary rotation speed Nm of the electric motor 33 is thus determined from the steering speed Ns. determined from the steering speed Ns.

In the micro-computer unit 76, the memory has stored in a continuously addressed manner in a certain area a set of numerical data of the armature current Ia as a function Ia(D) of the magnitude D of steering torque, whereas the current Ia has such a relation to the magnitude D as shown in FIG. 12. Accordingly, when given a value of the magnitude D of steering torque, it is permitted to determine the value of necessary armature current Ia(D) as one of the stored data to be identified by simply designating a corresponding address, without performing extra computations.

Moreover, as will be comprehended from FIG. 13 showing operating characteristics of the direct-current motor 33, while the armature current voltage Va to be applied across the motor 33 is kept constant, in proportion to increase in load torque Tm on the motor 33 the armature current Ia increases and the motor rotation speed Nm decreases. On the other hand, in the case where the load torque Tm is constant, the motor rotation speed Nm increases as the armature voltage Va increases while the armature current Ia is kept constant.

Thus, the necessary motor rotation speed Nm is determined from the steering speed Ns, and the necessary armature current Ia(D) is determined by address designation according to the magnitude D of steering torque.

The memory of the micro-computer unit 76 has stored in a matrixingly continuously addressed manner in another area a set of numerical data of the armature voltage Va as a function of both the motor rotation speed Nm and the armature current Ia in correspondence to such relations thereamong as shown in FIG. 13. Accordingly, when given respective values of the motor rotation speed Nm and the armature current Ia, it is permitted to determine the value of necessary armature voltage Va as one of the stored data to be identified by simply designating a pair of corresponding addresses. Exemplarily, when the necessary motor rotation speed Nm is determined to be $N_1$ in FIG. 13 and the magnitude D of steering torque is given as a value $D_1$ in FIG. 12 and hence the necessary armature current Ia(D) is determined to be $Ia_1$ in FIGS. 12, 13, there is determined a value $V_2$ in FIG. 13 as the necessary armature voltage Va.

In correspondence to a thus determined value of the necessary armature voltage Va, the voltage control signal is determined.

Practically, however, numerical data of the armature voltage Va are stored so as to permit the voltage Va to be determined by address designation according to respective values themselves of the steering speed Ns and the armature voltage current Ia(D), without the need of determining the necessary motor rotation speed Nm from the steering speed Ns. The reason why such operation is possible resides in the proportional relation or linearity between the motor speed Nm and the steering speed Ns.

Accordingly, the armature voltage Va ia determined by address designation based on the steering torque representative signals $S_1$, $S_2$ and the steering speed signal $S_4$, thus resulting in increased control speed of the micro-computer system 76.

Referring again to the flow chart of FIG. 9A, at step 322, the clutch current control signal $T_6$ for the electromagnetic steering torque. In respect of the signal $T_6$ also, the determination is made by way of address designation. More particularly, first the clutch excitation current Ic is determined by address designation according to the necessary armature current Ia(D) which is determined from the computed magnitude D of steering torque. In this respect, the clutch current Ic has such a relation to the armature current Ia(D) as shown in FIG. 14. Then, in correspondence to the thus determined clutch current Ic, the clutch current control signal $T_6$ is determined. In FIG. 14, designated at reference character Ico is a bias current component of the clutch current Ic that is supplied for necessary absorption such as of frictional forces.

Then, at step 324, with respect to the steering speed Ns as determined from the steering speed signal $S_4$ from the steering speed detection circuit 82 and an apparent motor speed Nm' represented by the motor speed signal $S_3$ from the motor speed detection circuit 120, there is obtained a deviation M therebetween, such that M=|Nm'−Ns| or in other words the deviation M is determined as the absolute value of the difference between the apparent motor speed Nm' and the steering speed Ns, whereas such deviation may be otherwise represented, exemplarily in terms of a ratio between the steering speed Ns and the product of the motor rotation speed Nm and the gear ratio K of the reduction gearing 50. In this respect, the generator 48 of the motor speed detection circuit 120 has an output characteristic which assures a relation such that Nm'=Nm/K, where Nm' and Nm are the apparent and actual motor speeds, respectively, and K is the aforementioned gear ratio. Thus, the apparent motor speed Nm' is of a nature directly comparable with the steering speed Ns.

Then at a decision step 326, the magnitude of the deviation M is determined whether $M>M_0$, where $M_0$ is a predetermined critical value. If the deviation M is found within a permissible range under the value $M_0$, the program goes to step 334 which is an output step at which the control signals $T_3$, $T_4$, $T_5$, $T_6$ are output, as they are determined till then, without correcting the armature voltage control signal $T_5$ and the clutch current control signal $T_6$.

If the deviation M is larger than the value $M_0$, the program goes to the next decision step 328 where the apparent motor speed Nm' and the steering speed Ns are compared with each other by determining whether Ns>Nm'.

Then, if the steering speed Ns is faster than the apparent motor speed Nm', the program goes to step 330, where an increasing correction of the voltage control signal $T_5$ is made to increase the armature voltage Va to thereby raise the actual rotation speed Nm in terms of revolution number of the electric motor 33, and in correspondence thereto an increasing correction of the clutch current control signal $T_6$ is performed.

However, if the steering speed Ns is smaller than the apparent motor speed Nm', the program goes to step 332, where a decreasing correction is made of the voltage control signal $T_5$ to thereby lower the actual motor speed Nm as well as of the clutch current signal signal $T_6$. Thereafter, the program goes to step 334.

By the correction of the control signals $T_5$, $T_6$ through steps 324, 326, 330, and 332, very small variations in action of the electric motor 33 are eliminated as well as eliminating fluctuations of steering feeling due to very small variations in action of friction elements of the electromagnetic clutch 63 and the reduction gearing 50.

At the output stage 334, there are output the motor rotation direction controlling signals $T_3$, $T_4$ and the armature voltage control signal $T_5$, as it is corrected when necessary, to the electric motor drive circuit 100 and the clutch current control signal $T_6$, as it is corrected when necessary, to the electromagnetic clutch drive circuit 108.

As described, at the motor drive circuit 100, a PWM control is made of the armature voltage Va of the electric motor 33, depending on the rotation direction controlling signals $T_3$, $T_4$ and the voltage control signal $T_5$. Concurrently, at the clutch drive circuit 108, the excitation current Ic to the electromagnetic clutch 63 is PWM controlled, depending on the clutch current control signal $T_6$, so that the clutch 63 has a controlled clutching force proportional to the armature current Ia or output torque Tm of the electric motor 33, thereby effectively preventing useless or extra consumption of power at the clutch 63.

Finally, the program again goes to step 302.

FIG. 15 is a graph showing, respective relations for manual or powerless operation and power-assisted operation between steering torque Ts acting on the input shaft 4 and load torque Tl imposed from the steering gearbox onto the output shaft 7. Designated by small letter l is a straight-linear characteristic curve to be experienced in the powerless operation of the steering system, exemplarily in the case where the operation of the steering system is stopped at step 306, and capital letter L is a characteristic curve proper to the power-assisted operation of the steering system.

As will be seen from FIG. 15, according to this embodiment in which the quantity of the armature current Ia is determined from the magnitude D of steering torque by use of such an interrelation therebetween as shown in FIG. 12, the power-assisted characteristic substantially overlaps the powerless characteristic in a region small of the load torque Tl, but in other regions in which the load torque Tl is increased therebeyond the characteristic curve L of power-assisted operation is successfully kept substantially flat. As the load torque Tl is further increased along a range Re covering such values thereof that correspond to those values of the steering angle Th which are found between from the predetermined value $Th_1$ to the maximum value Thmax, the power-assisted characteristic curve L gradually rises, finally becoming coincident with the powerless characteristic curve l. The reason why the power-assisted characteristic is variable as illustrated by the curve L of FIG. 15 resides in that the armature current Ia is determined relative to the magnitude D of steering torque as shown in FIG. 12 on one hand and, and on the other hand, the magnitude D of steering torque is corrected in advance, at steps 315 to 318, as described, in consideration of the steering angle Th, with the effect that the armature current Ia is varied relative to the load torque Tl as illustrated by broken line of FIG. 15. In this connection, it will be understood from FIG. 14 that the clutch excitation current Ic is varied in proportion to the armature current Ia.

It is advised in respect of the foregoing matter that, while the vehicle is travelling, the load torque Tl practically is in substantial proportion to the steering angle Th.

Figure 16:
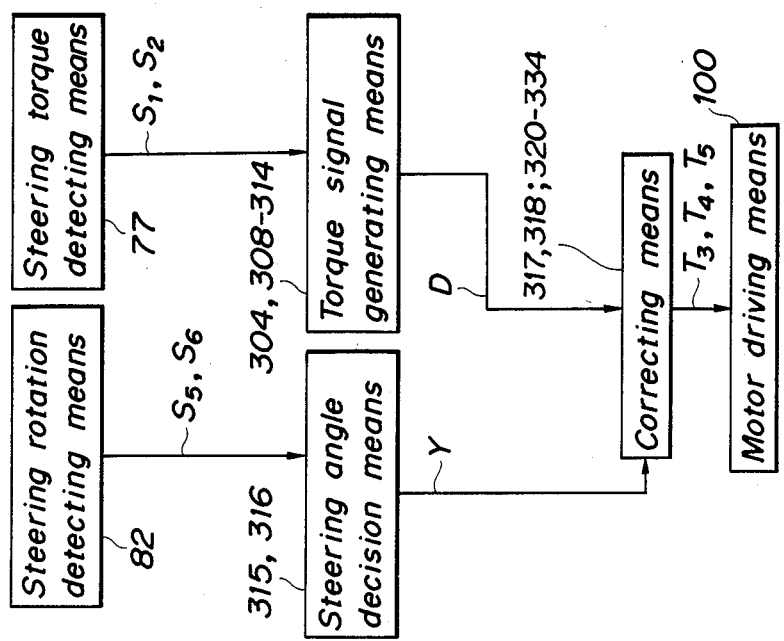
FIG. 16 is a schematic functional block diagram of the control circuit of FIG. 6.

FIG. 16 is a schematic block diagram in which various functions of the control circuit 75 are described by showing interrelations between essential elements of the circuit 75 as shown in FIG. 6 and associated program process steps in the flow chart of FIG. 9, directed to the unloading control process, thus eliminating such circuitry, detection signals, process stages, and control signals that have no direct relations to the unloading control process.

According to the preferred embodiment of the present invention, the armature voltage Va of the electric motor 33 basically is determined depending on the steering torque signals $S_1$, $S_2$ and the steering speed signal $S_4$, so that the actual rotation speed Nm of the motor 33 is favorably matched to the steering speed Ns of the input shaft 4 and hence of the steering wheel, thus assuring optimum steering feeling.

Moreover, as a particular distinct point, at steps 315 to 318, there is executed the unloading control process which permits, as the steering wheel approaches either of both steering ends thereof, the armature voltage Va applied across the electric motor 33 to be gradually reduced, finally becoming zero at the steering end, so that auxiliary torque being developed at the motor 33 also becomes correspondingly reduced, finally to zero at the steering end.

As a result, the durability of the electric motor 33 itself as well as that of the entirety of the power steering system is effectively elevated, and concurrently electric power consumption is successfully reduced to be saved of the entire system and particularly of the motor 33, in addition to that the unloading control process contributes to further improved steering feeling.

In the foregoing embodiment, until the steering angle Th as it has exceeded the predetermined value $Th_1$ thereof reaches the maximum steering angle Thmax, the magnitude D of steering torque as based on data thereof is gradually and continuously decreasingly corrected, to be finally reduced to zero. In this respect, the magnitude of torque as based on such data may advantageously be decreased to be corrected in a voluntary manner such as by straight-linear or stepwise reduction, or even without reduction in extreme cases, in the way to a zero state to be achieved at the steering end.

As will be comprehended, the point of the present invention resides in that, in an electric power steering system, auxiliary torque to be developed at an electric motor is made small or zero when a steering wheel is rotated close to either of both steering ends thereof. Accordingly, the present invention is effectively applicable to any power steering system that is provided with an electric motor adapted for development of auxiliary torque.

In this respect, the necessary mechanism for detecting the steering end may be of a voluntary type. Exemplarily, a code wheel may advantageously be fixed on a steering shaft to thereby detect a steering angle range in the vicinity of the steering end, and further a limit switch for detecting the steering end may preferably be provided on a steering shaft or in a rack and pinion mechanism itself.

Although there has been described what it is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. An electric power steering system for vehicles comprising:
   an input shaft operatively connected to a steering wheel;
   an output shaft operatively connected to a steered wheel;
   an electric motor for operatively supplying auxiliary torque to said output shaft;
   steering torque detection means for detecting steering torque acting on said input shaft;
   driving control means for feeding said electric motor with a motor drive signal based on an output signal from said steering torque detecting means;
   steering angle detection means for detecting a steering angle of said steering wheel; and
   correction means for gradually decreasing said motor drive signal to reduce said auxiliary torque to be developed at said electric motor, when said steering angle of said steering wheel is detected to be exceeding a predetermined angle by said steering angle detection means, said predetermined angle being slightly less than a maximum steering angle of said steering wheel.

2. An electric power steering system according to claim 1, wherein:
   said correction means is for decreasingly correcting said motor drive signal to zero, when said steering angle has exceeded said predetermined angle to thereby stop the operation of said electric motor.

3. An electric power steering system according to claim 1 wherein:
   said correction means is for decreasing said motor drive signal finally reducing to zero, as said steering angle is varied from said predetermined angle to said maximum steering angle, to thereby reduce said auxiliary torque to be developed at said electric motor, finally stopping the operation of said electric motor.

4. An electric power steering system according to claim 3, wherein:
   said correction means is for operatively and continuously correcting said motor drive signal till zero.

5. An electric power steering system according to claim 1, wherein:
   said motor drive signal to be fed from said driving control means to said electric motor (33) comprises an armature voltage signal.

6. An electric power steering system according to claim 1, further comprising:
   electromagnetic clutch means for transmitting torque developed at said electric motor to said output shaft and
   said driving control means for feeding said electromagnetic clutch means with a clutch drive signal based on said output signal from said steering torque detecting means.

7. An electric power steering system according to claim 6, further comprising:
   a reduction mechanism for transmitting said torque developed at said electric motor to said electromagnetic clutch means, while reducing the speed thereof.

* * * * *